Figure 1:
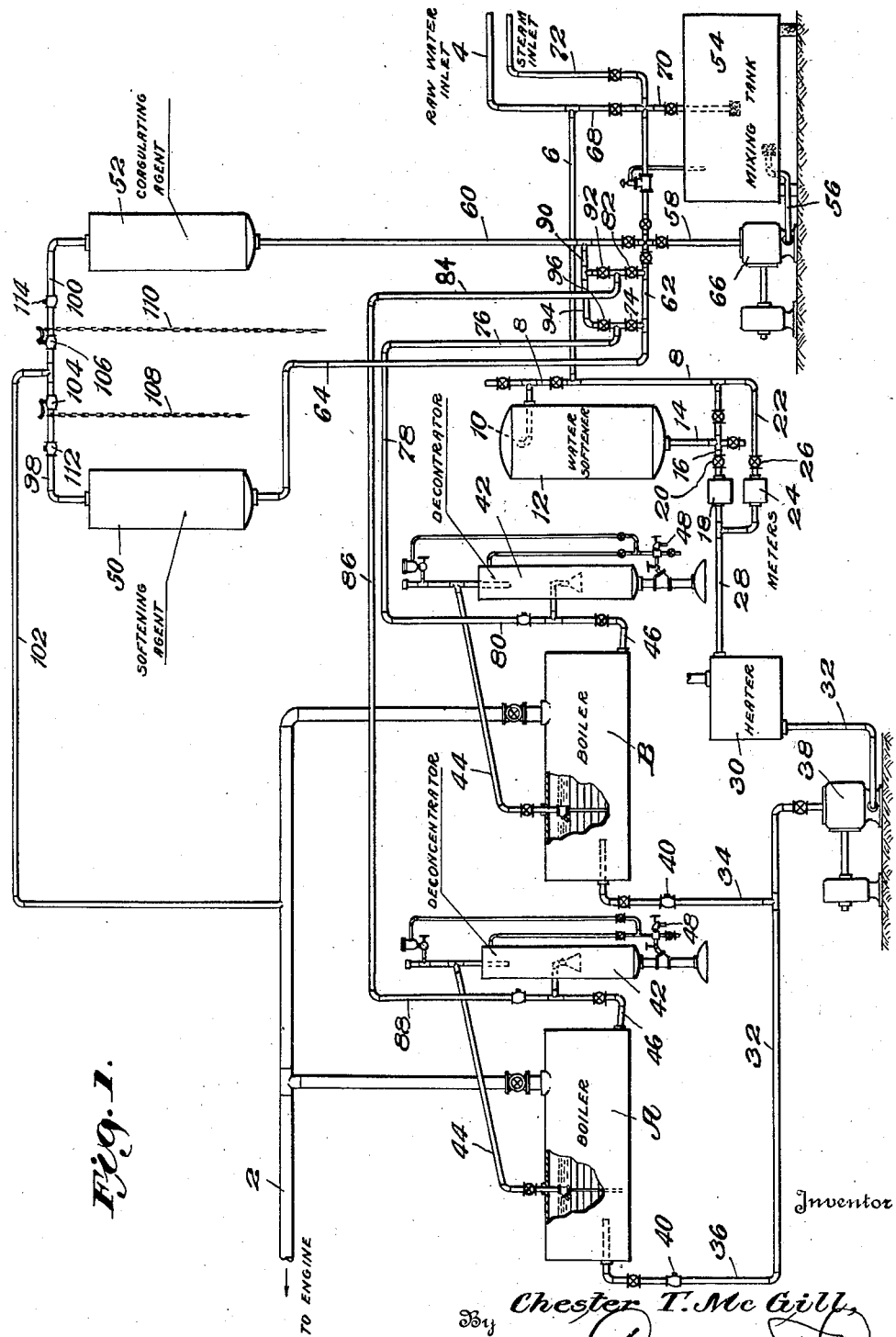

Fig. 2.

Patented Jan. 7, 1930

1,742,714

UNITED STATES PATENT OFFICE

CHESTER T. McGILL, OF ELGIN, ILLINOIS

PROCESS AND APPARATUS FOR TREATING BOILER WATER

Application filed August 29, 1927. Serial No. 216,317.

This invention relates to water treating apparatus, and has particular reference to an apparatus for conditioning water for use in steam boilers.

The use of hard or impure water in steam boilers results in the formation by deposition and precipitation of scale, mud, sludge, oil, and other deleterious matters within the boiler. To maintain the boiler at its maximum operating efficiency, frequent removal of such deposited matters must be made by thoroughly cleaning the boiler, an operation involving considerable labor and expense, and in addition, requiring that the boiler be entirely withdrawn from service. The boiler water problem is one of long standing, and has drawn the attention of inventors and specialists in the water treating field for a long period of years. Heretofore, it has been proposed to preliminarily condition boiler water by passing it through externally arranged softening apparatus, in which the hard minerals of the water are exchanged for soft and non-scaling minerals. Among the most successful of such external softeners are those in which the water is passed through a bed of zeolite. While the use of external water softeners has been accompanied by many beneficial results, experience has shown that the softened waters were not entirely free from objectionable qualities, and even after such softening treatment, precipitation within the boiler occurred and non-precipitation resulted in high concentration of both suspended solids and soluble solids within the boiler. Owing to the fact that it is impossible to control the water softened by external apparatus after it enters the boiler, this high concentration and resulting after-precipitation cannot be adequately controlled.

It has also been proposed heretofore to remove suspended and precipitable solids from the water in the boiler by the use of mechanical deconcentrators or sedimentation separators. The latter apparatus operates on a purely mechanical principle, and while effective in removing the suspended matter, naturally contributes to no extent in chemically changing the hardness of the water. The result is that neither external water softeners operating on the base exchange principle nor mechanical deconcentrators have solved the boiler water problem, and have left much to be desired in the way of efficient boiler operation.

A general object of the present invention is to improve on water treating systems heretofore in use, and particularly referred to above, by providing a complete and organized system for properly conditioning boiler water in all of its aspects, and whereby the water will be continuously maintained in the proper state of purity and softness.

A further object of the invention is to provide a system for treating boiler water, characterized by means for initially subjecting a portion of the raw water to a softening agency prior to its entry into the boiler, means for separating from the water in the boiler objectionable solid materials which have been produced by chemical and heat reactions within the boiler, and means for independently restoring the water thus treated to a predetermined condition by injecting into the water proper chemical reagents.

In a further aspect, the invention consists in a novel method of treating boiler water through which the water is placed in proper condition and continuously maintained in such condition while the boiler is in operation.

These and other features of the invention and the novel method referred to will appear more fully from the following detailed description when read in connection with the accompanying drawings, and will be pointed out in the appended claims.

In the drawing,

Fig. 1 illustrates diagrammatically an application of a preferred form of the invention to a battery of boilers; and Fig. 2 is a diagrammatic representation of the invention as applied to a single boiler.

When water is softened by a zeolite or other softener operating on the base exchange principle, the calcium and magnesium salts which give the scaling properties to the raw water are exchanged for sodium or other basic material used in the softener. In other words, the zeolite, when ready for use, carries the sodium ion which is exchanged for the calcium and magnesium in the raw water. A definite unit by weight of zeolite will carry a certain quantity of sodium ions, and when the sodium ion is exhausted by the exchange of minerals referred to by passing a quantity of raw water through the bed, the zeolite becomes inert and will no longer function to soften water. It then becomes necessary to revive the zeolitic bed by passing a solution of sodium chloride therein, this operation having the effect of restoring exchangeable sodium ions to the bed. As will be readily understood, the resultant effect of softening water by the zeolite process is that after softening, the water carries the corresponding salts of sodium in place of the calcium and magnesium normally found in raw unsoftened water. If the softened water is to be used for certain domestic purposes, such as laundering, drinking, cooking, or other household uses, the water will be in satisfactory condition after its treatment in the zeolite softener. However, the use of zeolite softened water as the feed water in steam boilers results in the development of certain serious conditions within the boiler, among which may be mentioned high concentration of caustic soda and alkalinity, which results in foaming and caustic embrittlement. The sodium hydroxide concentration builds very rapidly and brings about an emulsified condition, especially when oil gets to the boiler. To eliminate the foaming when all zeolited softener water is used, it is necessary to blow down the boilers often, this being a wasteful procedure owing to the large quantities of hot water and contained heat units lost thereby. Furthermore, when raw make-up water containing a high per cent of permanent hardness is zeolited, the resulting softened water, when subjected to the high boiler temperatures, produces a foaming condition or causes a scale deposit, due to the sodium sulphate concentration.

The present invention contemplates the elimination of the injurious effects of zeolite water, such as embrittlement of boiler metal, corrosion, and foaming. To this end only a portion of the feed water is subjected to the zeolite treatment, the remainder being passed directly to the boiler in its raw state. The effect of feeding a portion of the water to the boiler in a raw or untreated condition, and there combining such water with zeolite softened water, is a neutralization of the scale-forming solids of the raw water and the sodium hydroxide in the zeolited water, such neutralization being caused by the high boiler temperature and pressure.

While certain injurious effects of the zeolite water may be reduced in this manner, it is obvious that this step alone would not prove adequate owing to the accumulation of precipitated matter which would require frequent blow downs and a high waste of fuel. Eventually the formation of scale and sludge would result in such losses in boiler repairs and fuel wastage as to approximate the disadvantages of embrittlement and corrosion which would occur if zeolite water alone were used. It is therefore essential that provision be made for removing from the boiler water the suspended solids thrown down by the combination of the raw water and the zeolite water within the boiler at boiler temperature. The separation of these solids is accomplished by means of a sedimentation tank or deconcentrator arranged either internally or externally of the boiler. After the suspended solids have been removed by such apparatus, they are then discharged from the system as waste matter into a sewer or drain. By the combination described, the boiler water is given the proper degree of softness and the impurities or injurious solids are effectively removed.

After the water has been softened, and the deconcentrator has mechanically removed as much of the precipitated solids as is possible, the water may still contain objectionable matter which would interfere with the most effective operation. Foremost among such matters is the oil which inevitably accumulates as the condensate returns to the make-up water, or which may be present in the raw water. Oil in the boiler water acts as a binder in holding the fine molecules of precipitated suspended matter in semi-soluble condition, thereby giving to the latter the same effective specific gravity as the water itself, and thus interferes with the ready precipitation and removal of the solids by the mechanical separator. Unless this condition is corrected, and as the evaporation continues, the concentration increases and the boiler water soon reaches a point of saturation, at which the water will not take on more of the fine molecules or a greater quantity of oil. Such a condition gives rise to foaming, and produces a moist saturated steam which carries abrasive matter to the cylinders and turbines with the usual objectionable results. To counteract this effect, any well-known coagulating reagent, such as sulphate of iron or sulphate of aluminum is injected into the water at such times and in such amounts as is necessary to clarify the boiler water and precipitate the semi-soluble particles into a form which permits removal by the deconcentrator.

The operations above described will serve to maintain the water in a single boiler in proper service condition. When, however, a battery of boilers is provided, a further complication arises which requires additional steps in order to secure and maintain the most effective results. In operating a power plant consisting of a battery of boilers, due to existing working conditions, evaporations in the individual boilers vary from day to day. When such uneven evaporation between the boilers occurs, the water in the boiler in which greatest evaporation is taking place may become too soft, owing to the fact that it is receiving a greater percentage of the zeolite water than the other boilers, and similarly, the water in one boiler may be undertreated and consequently scale forming, due to the fact that it receives an excess supply of raw water. In either event, the chemical balance or proportion between the softened and unsoftened water is destroyed, the result being that if the balance is not promptly restored, scaling, foaming and other undesirable conditions will develop. It will readily be appreciated that when a battery of boilers is used, it is not possible to control the zeolite softened water in one boiler without effecting a corresponding change in the other. Such being the case, the abnormal condition in one boiler would only be remedied at the expense of another. To meet this situation, means are provided for selectively adding a predetermined amount of softening compound to each individual boiler, and thereby insuring that the water in the boiler which is undersoftened is restored to its proper degree of softness. By such an arrangement, the main zeolite water supply to the boilers remains uneffected, and only such boilers as require are chemically treated. When the chemical balance in one of the boilers is destroyed by the oversoftening of the water, an excess of raw water is fed to the battery of waters. This restores the balance to the boiler having oversoftened water, but incidentally, at the same time, destroys the balance in the boiler or boilers which were formerly properly softened. To avoid this unbalanced condition in the latter boilers, a proper amount of softening chemical is delivered to these boilers. Also, when a battery of boilers is utilized, means are provided for feeding a coagulating agent to each boiler, such means being so constructed and arranged as to permit an injection into each individual boiler independent of the remainder of the battery.

The method of operating a treating system such as described can be carried out by various forms of apparatus, and it should be distinctly understood that the invention is not limited to any particular form. The accompanying drawings illustrate a preferred embodiment of the invention and the arrangement of parts shown therein will now be described.

Referring to Fig. 1, the characters A and B designate steam boilers from which the developed steam is conducted by a pipe 2 to a turbine, engine, or other power-developing means. The raw water supply pipe, indicated at 4, is connected by means of the pipe 6 to the vertical pipe 8, the upper end of which communicates with the inlet pipe 10 leading to a water softener indicating generally at 12. Any type of standard water softener may be employed, such as, for example, the softener illustrated in the patent to Gans, No. 1,195,123, and utilizing a zeolite bed. The particular softening agent employed is not material to the present invention, and it will be understood that other softeners than zeolite may be employed, such as lime and soda ash. Inasmuch as the construction of the softener per se differs in no essential respect from the construction described in the patent preferred to, no detailed description of the construction or operation thereof is considered necessary. The softened water is discharged from the softener through an outlet pipe 14, connected at its lower end to a pipe 16 leading to a water meter 18. The pipe 16 is provided with a valve 20 for controlling the flow of the softened water. The lower end of the pipe 8 is connected with the pipe 22 leading to a water metering device 24. To control the flow of water through this meter, a valve 26 is interposed at any convenient location along the pipe 22. It will be noted that the pipes 8 and 22 constitute a by-pass for delivering raw water which is not to be treated by the softening apparatus 12. After leaving the metering devices, the softened and unsoftened streams of water are joined in a common conduit 28, the latter leading to a heating device 30 of any well known construction. A pipe 32 carries the water from the heater to the boilers by means of branch pipes 34 and 36, a pump 38 being provided in the circuit for feeding the boilers. Check valves 40 may be arranged in each of the branch pipes. Adjacent each of the boilers in the battery is arranged a deconcentrator or sedimentation separator 42. Although various types of structures are adaptable for the purpose, the drawings illustrate a deconcentrator constructed in accordance with the applicant's prior Patent No. 1,593,700. Water in the boilers is delivered to the deconcentrator through the pipe 44, and is returned through the pipe 46. As will be readily understood by referring to the patent, the circulation of the water through the deconcentrator is continuous during the operation of the boiler. The purpose of the deconcentrator is to mechanically remove by precipitation the solid and suspended matter developed in the boiler. The accumulated solids or waste materials in the deconcentrator are discharged from the latter through a pipe 48 leading to a sewer or other convenient receiving vat.

Tanks 50 and 52 are provided to receive chemical materials which are to be added to the boilers under certain conditions. For example, the tank 50 may be filled with a water softening chemical such as sodium carbonate, sodium hydroxide, or trisodium phosphate, while the tank 52 may be filled with a coagulating agent such as sodium aluminate, alum, sulphate of iron, or similar materials. The tanks 50 and 52 are supplied from a mixing tank 54 by means of pipes 56, 58, 60, 62 and 64. A pump 66 forces the chemical materials through the conduits described to the receiving tanks. The chemicals used as coagulating or softening agents are placed in the mixing tank 54 in either dry or concentrated liquid form. Subsequently, the chemicals are diluted by the passage of water from the main inlet pipe 4 through the pipes 68 and 70, or by steam entering through pipes 72 and 70, or by both water and steam.

The softener within tank 50 is delivered to the boiler B through pipes 64, 62, valve 74, pipes 76, 78, 80, and 46, the latter pipe being the return conduit from the deconcentrator 42. A corresponding arrangement of pipes consisting of 64, 62, valve 82, pipes 84, 86, 88 and 46 delivers the softener to the boiler A. The coagulating agent within the tank 52 is delivered to the boiler A through pipes 60, 90, valve 92, pipes 84, 86, 88 and 46, and to the boiler B by 60, 90, 94, valve 96, pipes 76, 78, 80 and 46.

The upper end of the tanks 50 and 52 are connected by means of branch pipes 98, 100, and pipe 102 to the steam header 2 of the boilers so as to break the vacuum created by the withdrawal of the chemicals, and thus permitting a free flow. The tanks 50 and 52 are also elevated above the water line of the boilers so as to obtain a gravity feed to the boilers. Valves 104 and 106 are arranged in the branch pipes 98 and 100 leading to the tanks 50 and 52 respectively. For connecting or disconnecting the tanks to the steam header and for convenience in operation, the valves 104 and 106 may be provided with operating chains 108 and 110. Check valves 112 and 114 prevent the chemicals within the tanks 50 and 52 from being carried or pumped into the steam line.

Figure 2:
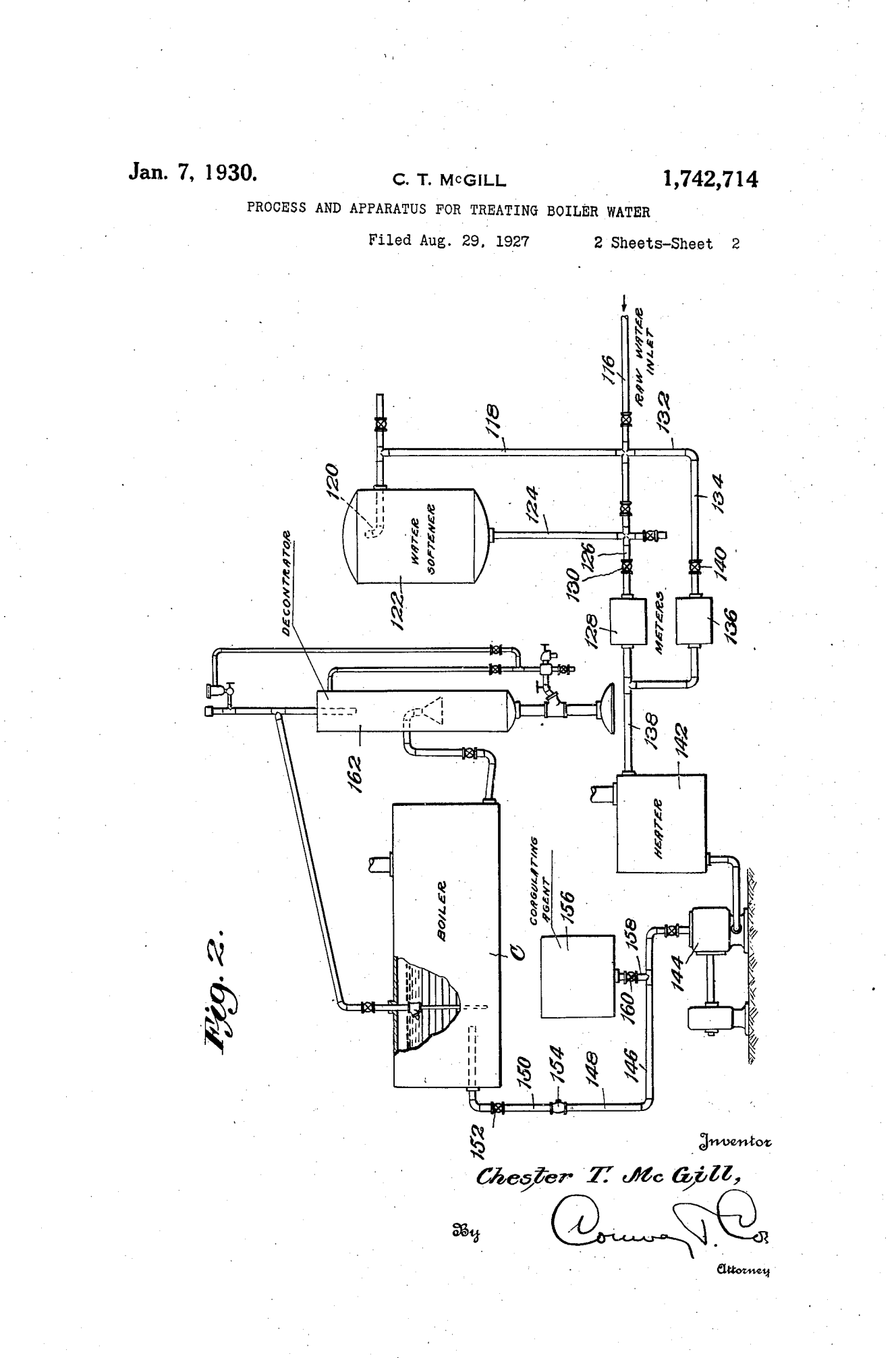

Fig. 2 represents an application of the present treating system to a single boiler C. As illustrated, the raw water enters through an inlet pipe 116 connected to a pipe 118, the upper end of which communicates with the inlet 120 to a water softener 122. The softened water is discharged through the outlet pipe 124 in communication with a pipe 126 which is provided with the metering device 128. A valve 130 is arranged in the pipe 126 between the metering device and the softener to control the flow of softened water. Raw water from the inlet pipe is led through the pipes 132 and 134 to a metering device 136, and thence into the pipe 138 which carries the softened water from the meter 128. A control valve 140 is arranged in the pipe 134 for controlling the flow of raw water. The pipe 138 leads to a heater 142 in which the water is heated to the proper temperature. A pump 144 is located at the discharge end of the heater and forces the water through the pipes 146, 148 and 150 into the boiler. A hand controlled valve 152 and a check valve 154 may be interposed in the pipe 150.

A tank 156 containing a coagulating agent is connected to the pipe 146 by means of a pipe 158, thus permitting an injection of the coagulating agent into the incoming feed water. A valve 160 is provided for controlling the discharge of the coagulating agent. Connected to the boiler is a deconcentrator 162, similar in all respects to those referred to in connection with Fig. 1.

In treating the water fed to a battery of boilers, the raw water is admitted through the inlet pipe 4. A proportion of the raw water is conducted through the pipes 6, 8 and 10 into the softener 12, wherein it undergoes the customary softening process. That portion of the water which is not fed to the softener is by-passed through the pipes 6, 8 and 22 into the metering device 24. The proportion of raw water passing through the softener varies with the particular raw water being used, and is approximately determined by a mineral analysis of the raw water. After the softened water has been united with the by-passed raw water, it passes through the heater 30, from whence it is fed into the boilers by the system of pipes provided for that purpose. When the water thus preliminarily treated is elevated to the operating boiler temperatures, a precipitation of solid matter begins to take place as the result of the chemical and heat reactions upon the ingredients of the water. The water in the boilers is continuously being withdrawn into the deconcentrator 42, wherein the suspended and precipitated solids are separated, the pure water being thereafter returned into the boilers. At regular predetermined intervals, samples of the boiler water are withdrawn from each boiler and tested for hardness and alkalinity due to sodium hydroxide and sodium carbonate, said tests indicating the condition of the boiler water. Should the tests referred to indicate a normal condition in all of the boilers, it will be known that the water is in proper condition and no softening or coagulating agents are required. If, however, the tests indicate that the water in one of the boilers is undersoftened, the tank 50 is connected thereto by opening the appropriate valves and a sufficient quantity of softening agent is introduced to that boiler to produce the desired degree of softness in the water. If the tested specimen appears cloudy or turbid, it indicates the presence of oil or some other binder, the effect of which must be corrected by the addition of the coagulating agent. Therefore, the tank 52 containing such an agent would be placed in communication with the boiler and an appropriate amount of the reagent introduced until the abnormal condition has been rectified. These tests are continued at predetermined intervals so that a careful check on the condition of the water may be had at all times. It has been found advisable in practice to record the results of the tests so that a regular recurrence of a certain condition can be detected and some appropriate change affected which will in a large measure eliminate the variation of the water from normal.

The operation of the system on a single boiler is not fundamentally different from that incident to a battery of boilers, the main difference being the absence of an auxiliary softening tank. As the degree of softness may be varied by a regulation of the softener, no further softening reagent is required. The coagulating agent from the tank 156 (Fig. 2) is added at intervals as the results of tested samples indicate, this operation being similar to that described in connection with the plurality of boilers.

Through the apparatus and method described, the boiler water is placed in the desired condition and so maintained throughout the operation of the boiler. It is possible to operate the boilers continually for months without cleaning or resorting to expensive blow downs. The efficiency of the boiler is maintained at the maximum and the expense of operation is reduced to the lowest possible point.

Having thus described the invention, what I claim as new and desire to secure by Letters Patent of the United States is:

1. A process for treating water used in steam boilers which comprises passing a portion of the raw water through a bed of softening chemicals, bypassing the remainder of the raw water around the softening chemicals so as to leave it in an untreated condition, conducting the softened and the bypassed water to the boiler, removing precipitated and suspended solids from the water in the boiler by a mechanical separation, and independently adding additional chemicals to the water in the boiler to obtain the desired water condition.

2. A process for treating water used in steam boilers which comprises passing a portion of the raw water through a bed of softening chemicals, passing the remainder of the water to the boiler in an untreated condition, removing precipitated and suspended solids from the water in the boiler, periodically subjecting the water in the boiler to a chemical analysis to determine the condition thereof, and adding additional chemicals to the water to correct abnormal conditions indicated by the tests.

3. A process for treating water used in steam boilers which comprises passing a portion of the raw water through a bed of softening chemicals, bypassing a portion of the raw water around the softening chemicals, conducting the softened and bypassed water to the boiler, and removing precipitated solids from the boiler water while the boiler is in operation.

4. A process for treating water used in a battery of steam boilers which comprises passing a portion of the raw water through a bed of softening chemicals, passing a portion of the raw water to the boilers in an untreated condition, removing precipitated solids from the water in each boiler, and independently adding additional chemicals to the individual boilers to maintain the water therein in proper condition.

5. A process for treating water used in a battery of steam boilers which comprises passing a portion of the raw water through a bed of softening chemicals, passing a portion of the raw water to the boilers in an untreated condition, removing precipitated solids from the water in each boiler while the latter is in operation, and periodically adding to the water in each individual boiler a neutralizing chemical as water conditions require.

6. A process for treating water to be used in a battery of steam boilers which comprises passing a portion of the raw water used in the boilers through a bed of softening chemicals, passing a portion of the raw water to the boilers in an untreated condition, removing precipitated solids from each boiler, periodically testing the water in each boiler to determine the condition thereof, and adding chemicals to such boilers to correct any abnormal conditions noted in such tests.

7. A process for treating water to be used in a battery of steam boilers which comprises passing a portion of the raw water through a bed of softening chemicals, passing a portion of the raw water to the boilers in an untreated condition, removing from each boiler the precipitated solids formed therein, periodically testing the water of each boiler for hardness, and adding raw water to all of the boilers if the tests indicate that at least one of the boilers is oversoftened, and independently adding a neutralizing agent to a boiler in which an abnormal condition exists.

8. Apparatus for treating water in steam boilers comprising an external softener, means for leading a portion of the raw water through said softener and subjecting it to a softening process, means for delivering untreated raw water to the boiler, a deconcentrator for removing precipitated solids from the water in the boiler, means for admitting the water in the boiler to the deconcentrator, means for returning the purified water to the boiler, means for storing a neutralizing agent, means for connecting the storing means to the boiler, and means for controlling the admission of the agent into the boiler.

9. Apparatus for treating water in steam boilers comprising an external water softener, means for leading a portion of the raw water through said softener and subjecting it to a softening process, means for delivering a portion of untreated raw water to the boiler, and means for removing from the boiler precipitated matter resulting from the reaction between the softened and untreated water.

10. Apparatus for treating water in a battery of steam boilers comprising an external softener, means for leading a portion of the raw water through said softener and subjecting it to a softening process, means for delivering a portion of untreated raw water to each boiler, a deconcentrator for removing precipitated solids from the water in each boiler while the boilers are in operation, a container for a neutralizing agent, connections between said container and each boiler, and means for controlling the passage of said agent through said connections whereby the agent may be added to each boiler at will.

11. A water softening process which comprises passing a portion of the hard water through a bed of softening chemicals to produce a quantity of alkali metal carbonate equivalent to the permanent hardness in the remaining portion of the water which has not been subjected to the softening chemical treatment, mixing and reacting the treated and untreated portions and subjecting the mixture to heat.

CHESTER T. McGILL.